(12) United States Patent
Weichholdt

(10) Patent No.: US 6,715,273 B2
(45) Date of Patent: Apr. 6, 2004

(54) STALK DIVIDER

(75) Inventor: Dirk Weichholdt, Sarreguemines (FR)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/246,302

(22) Filed: Sep. 17, 2002

(65) Prior Publication Data

US 2003/0056482 A1 Mar. 27, 2003

(30) Foreign Application Priority Data

Sep. 22, 2001 (DE) .......................................... 101 46 768

(51) Int. Cl.⁷ .............................................. A01D 63/04
(52) U.S. Cl. ....................................................... 56/314
(58) Field of Search ........................ 56/314, 119, 17.3, 56/319, 109; 292/32, 44, 57, 59, 60, 61, 63, 68, 137, 163, 166, 219, 228

(56) References Cited

U.S. PATENT DOCUMENTS

| | | | | |
|---|---|---|---|---|
| 703,497 A | * | 7/1902 | Steward | 56/319 |
| 1,859,208 A | * | 5/1932 | Kane | 56/319 |
| 2,209,047 A | * | 7/1940 | Berg et al. | 56/319 |
| 4,296,593 A | * | 10/1981 | Webb et al. | 56/98 |
| 4,413,848 A | * | 11/1983 | Leaver et al. | 292/59 |
| 4,997,218 A | * | 3/1991 | Culling | 292/60 |

FOREIGN PATENT DOCUMENTS

| | | | |
|---|---|---|---|
| CH | 321010 | * | 6/1954 |
| DE | 1482848 | * | 10/1965 |
| DE | 1 926 441 | | 11/1970 |
| DE | 2 058 255 | | 8/1971 |
| DE | 128 878 | | 12/1977 |
| DE | 0 539 745 A1 | | 5/1993 |
| EP | 24 54 479 A1 | | 5/1976 |
| EP | 45015 | * | 3/1982 |
| EP | 0 539 735 B1 | | 5/1993 |
| EP | 1 036 495 B1 | | 9/2000 |
| GB | 485 | * | of 1900 |

* cited by examiner

Primary Examiner—Robert E. Pezzuto
Assistant Examiner—Alicia Torres

(57) ABSTRACT

A deflector of a stalk divider for a harvesting assembly can be pivoted about a pivot axis defined by a joint between an operating position and a transport position. The deflector can be held in the operating position and in the transport position. The joint is provided with a first locking element for holding the divider in the operating position. The joint is provided with a second locking element for holding the divider in the transport position. The first locking element is spaced at a greater distance from the pivot axis than the second locking element.

15 Claims, 4 Drawing Sheets

STALK DIVIDER

FIELD OF THE INVENTION

The present invention is directed to a stalk divider for a harvesting assembly, having a deflector, that can be pivoted between an operating position and a transport position and that can be held in the operating position and the transport position.

BACKGROUND OF THE INVENTION

A stalk divider that can be pivoted about a vertical pivot axis between an operating position and a transport position is disclosed by DE 24 54 479 A. The stalk divider is held in these two positions by means of a single spring loaded latch that is located above the pivot axis.

EP 0 539 735 A shows a stalk divider for a combine that can be pivoted about a joint between an operating position and a transport position with a pivot axis extending vertically. The device is locked by a socket pin that extends through holes in the pivoted and the fixed part of the stalk divider.

EP 1 036 495 A discloses a stalk divider that can be pivoted by a joint between an operating position and a transport position about a pivot axis extending inclined forward and inward. A cotter pin is used here for the holding by inserting it through corresponding holes in the housing of the joint. The position of the holes is not described in any further detail.

With the known stalk dividers that can be pivoted between an operating and a transport position, the dimensioning of the arresting location of the joint is seen as problematical. If the locking arrangement is located too close to the pivot axis, the point of the stalk divider has a large amount of play, that can lead to irregular edges of the harvested crop during the harvesting process. If it is removed further from the pivot axis, elements projecting to the sides are required that are needed for holding the stalk divider in the transport position. On these elements projecting to the sides stalks of the cereal crop can become entangled that can lead to jams. When these jams occur, the result is the so-called pushing of the cutter head, which signifies that the stalk divider no longer performs its function, but only pushes the stalks downward and/or forward, resulting in harvesting losses.

SUMMARY OF THE INVENTION

It is an object of the present invention to provide an improved pivoted stalk divider, that has little play at the point of the stalk divider during harvesting, but on which as few stalks as possible become entangled.

The pivot joint of the stalk divider has two locking elements. A first locking element is arranged to arrest the joint—and therewith the deflector—in the operating position. A second locking element is arranged to arrest the joint in the transport position. The first locking element is spaced at a greater distance from the pivot axis than the second locking element.

In this way the deflector has only a small amount of play in the operating position, since the first locking element is effectively spaced relatively far from the pivot axis. The second locking element is effective in the transport position in which it is not noticeably troublesome if the stalk divider point has a greater amount of play due to the smaller spacing between the pivot axis and the second locking element. The smaller distance between the pivot axis and the second locking element, however, makes it possible to keep the sideways dimensions of the joint more compact, so that hardly any stalks can become entangled with it. It should be noted that it does not matter whether the locking elements are pivoted with the deflector or remain stationary. The corresponding detent elements, with which the locking elements interact for the holding, are then either stationary or are pivoted with the deflector.

Preferably the first and the second locking elements are located along a straight line that extends through the pivot axis and in the forward operating direction of the stalk divider. Thereby both locking elements are located ahead of or behind the pivot axis, while (in the case of pivoted locking elements) they are located to the side in the transport position. The detent elements that interact in the transport position with the second locking element, require only a relatively small spacing to the side from the pivot axis, so that any entanglement of stalks of the crop need not be feared. Furthermore, the arrangement of both locking elements on a straight line makes it possible to couple them mechanically, so that they can be operated manually together.

It has been shown to be advantageous that a spring brings the first and/or the second locking element into a detent position. The spring is preferably coupled with both locking elements, it forces the locking element into a correspondingly fixed detent element, that can be pivoted with the deflector or remain stationary. The locking element can be released from the detent element against the force of the spring manually or by any other desirable means, so that the deflector can be pivoted freely.

In the illustrated embodiment the spring is arranged in a tube retaining the deflector. The first and/or the second locking element can also be arranged within the tube. They can be arranged there so as to move between a detent position and a release position, for example, they can be shifted. The result here is a compact configuration on which stalks of the crop can hardly become entangled. The tube containing the spring and the locking elements may be stationary or pivot with the deflector. It should be noted that such a configuration of a spring with a locking element in a tube could also be used if the deflector is arrested by one and the same locking element in the operating position and the transport position as is the case in the state of the art described.

As has already been noted, the locking elements interact with the detent elements associated with them, where either the locking elements or the detent elements are stationary and the other elements are pivoted with the deflector. As detent elements a cut out can be used, for example, in any desirable element such as a plate-shaped element.

Because of the differing distances between the pivot axis on the one hand and the first or the second locking element on the other hand, the detent elements, as a rule, are also located at differing distances from the pivot axis. In order to avoid collisions an obvious solution is to arrange a detent element below the pivot bearing arrangement and a detent element above the pivot bearing arrangement. Here the detent elements can be arranged in particular in a single retainer that encloses a carrier in a U-shaped component. As a rule the carrier is a tube and is either coupled to the deflector or is stationary.

The stalk divider according to the invention can be applied to all types of harvesting assemblies, such as mower headers, corn heads or pickers. The harvesting assembly front attachment can be applied, in particular, to harvesting machines, such as combines or forage harvesters. The joint can also be supplied as a separate element and mounted on separate or already existing stalk dividers.

DETAILED DESCRIPTION

Figure 1:
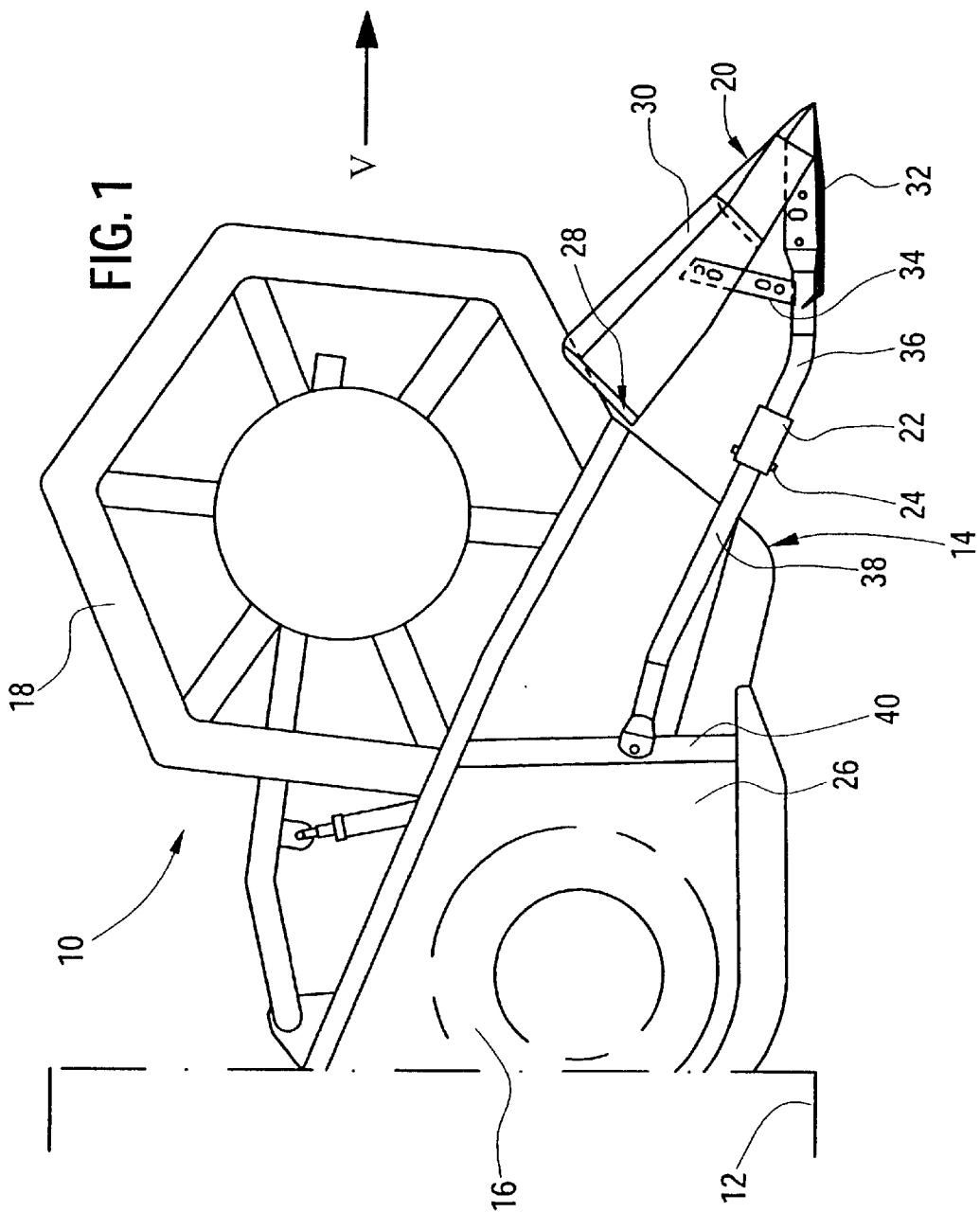
FIG. 1 shows a side view of a harvesting assembly for a combine with a stalk divider in operating position.

FIG. 1 shows a harvesting assembly 10 in the form of a harvesting platform for a combine, not shown, that can be attached to the front side of the feeder house 12, shown schematically. The harvesting assembly 12 is provided with a cutter bar 14 extending in a transverse direction relative to the forward direction of travel V. Cut crop from the cutter bar 14 is directed to an intake conveyor 16. In the illustrated embodiment the intake conveyor is a screw conveyor that concentrates the cut crop in the center of the harvesting platform so that is can be taken up by the feeder house 12. A reel 18 having tines is located in front of the cuter bar 14 and holds the standing crop against the cutter bar 14 as the crop is being harvested. The sides of the harvesting assembly 10 are provided with stalk dividers 20, only one shown. The stalk divider 20 is positioned in front of the reel 18 and the cutter bar 14. The stalk divider 20 points to the front in the forward operating direction V of the combine. As a rule two symmetrical stalk dividers 20 are arranged on both sides of the harvesting assembly 10. Both sides of the harvesting assembly 10 are provided with side walls 26 having triangular-shaped front regions with points 28. It should be noted that in the following the designations of directions, such as, ahead, behind, over, under, to the side, etc. refer to the forward direction of operation V.

The stalk divider 20 comprises a deflector 30, a bottom sheet 32, a support 34 and a first tube 36. The first tube 36 is fastened by a joint 22 to a second tube 38, which is attached to a strut 40 mounted to the side wall 26 of the harvesting assembly 10. The deflector 30 has a cross section in the shape of an inverted U. The deflector 30 is fixed relative to the first tube 36 by the support 34. In its operating position the deflector 30 is inclined upward and rearward in relation to the forward operating direction V. The support 34 is welded to the first tube 36. The bottom sheet 32 is arranged to slide along the ground and is attached to the flattened front side of the first tube 36. The stalk divider 20 is used to separate a track of harvested crop from the adjoining track that has not yet been harvested. Therefore the stalk divider 20 is shaped with a point in its forward region in the forward operating direction V.

Figure 2:
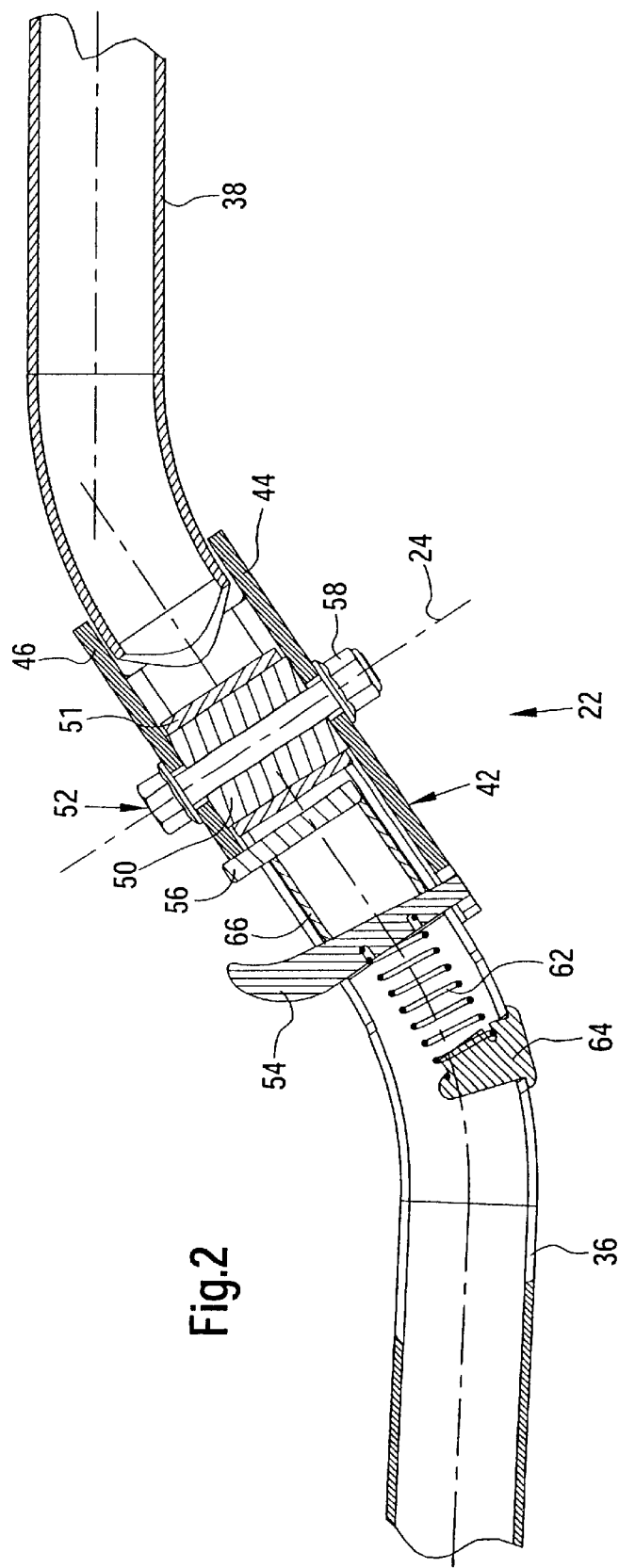
FIG. 2 shows a vertical section through the joint of the stalk divider in the operating position.
Figure 3:
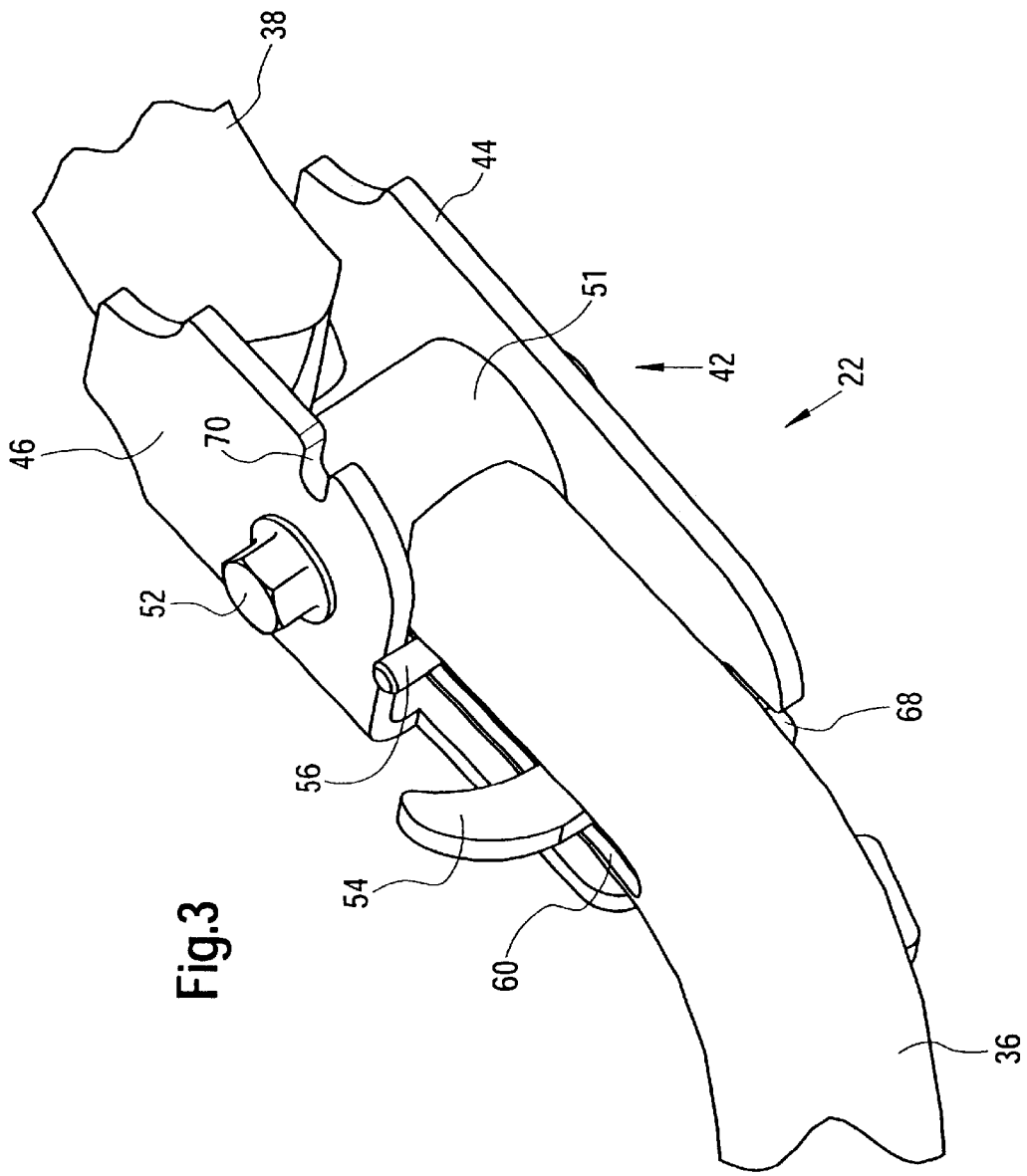
FIG. 3 shows a perspective view of the joint in the operating position.
Figure 4:
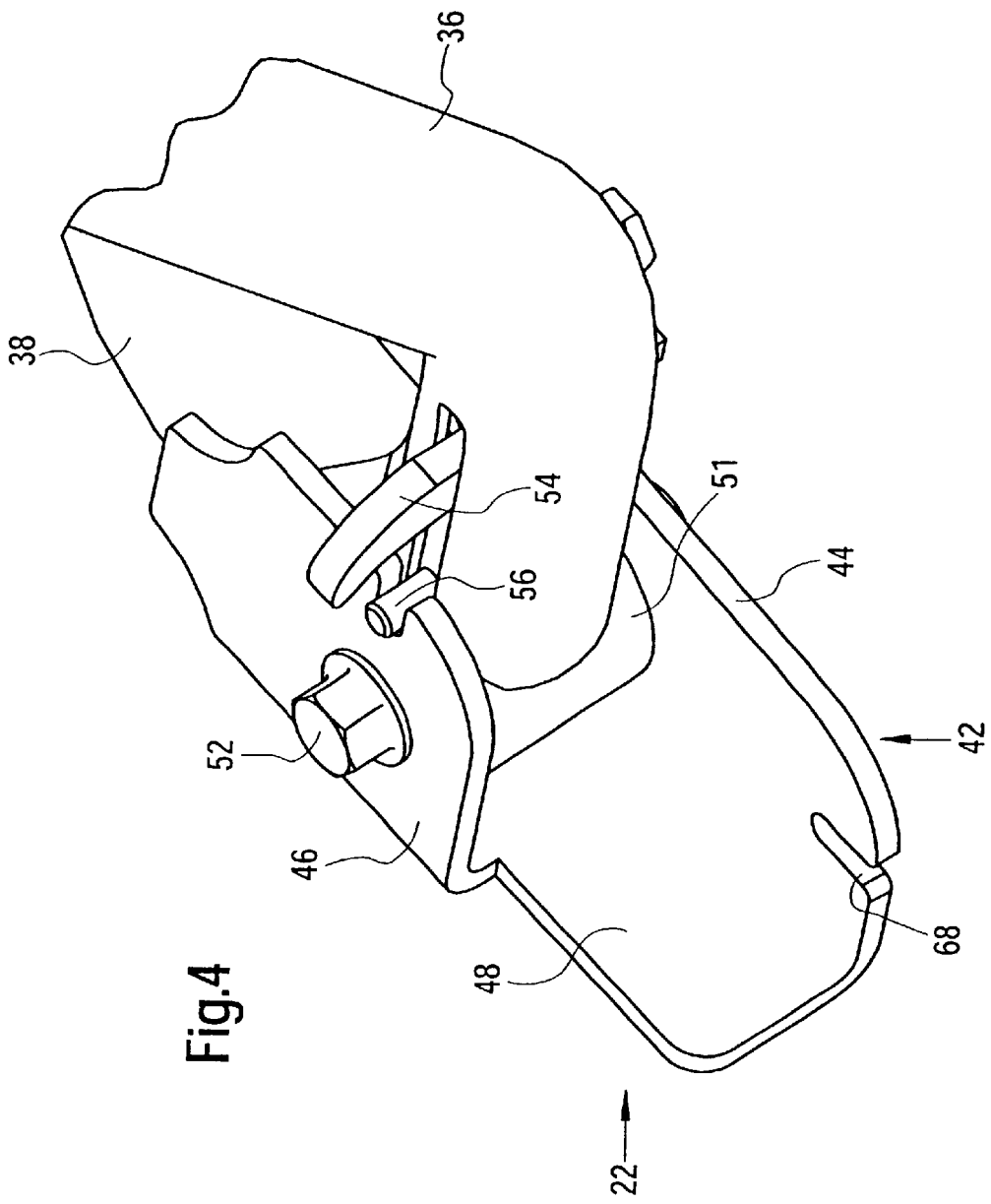
FIG. 4 shows a perspective view of the joint in the transport position.

The first tube 36 of the stalk divider 20, shown in FIGS. 1 through 3 is arranged in its operating position, and in FIG. 4 in its transport position. In its transport position, the deflector 30 is pivoted by a joint 22 about a pivot axis 24 through approximately 90° inward towards the center of the harvesting assembly 10. The pivot axis 24 of the joint 22 does not extend exactly vertically, but, as can be seen in FIG. 1, is inclined forward in the forward operating direction V (in counterclockwise direction as seen in the drawings).

The joint 22 is shown in greater detail in the cross section view of FIG. 2. The joint 22 includes a U-shaped retainer 42, to which the second tube 38 is mounted, for example, by welding. The retainer 42 is provided with two legs 44 and 46 that are substantially parallel to one another. The first leg 44 is located beneath the second tube 38 and the second leg 46 is located above the second tube 38. The legs 44 and 46 and the rear wall 48 connecting them (see FIG. 4) enclose the forward end region of the second tube 38 as seen in the forward operating direction V.

The first tube 36 is connected to a sleeve 51 with a cylindrical journal 50 that is arranged in the sleeve 51 and that is also located between the first leg 44 and the second leg 46. The journal 50 is provided with a central bore through which a pivot pin 52 extends. The longitudinal axis of the pivot pin 52, the longitudinal axis of the bore in the journal 50 and the pivot axis 24 are coaxial. The journal 50 with the first tube 36 that is attached to it can therefore be pivoted about the pivot axis 24. The pivot pin 52 is provided at its upper end with a projecting head and is secured at its lower end by a nut 58 that interacts with a corresponding thread of the pivot pin 52 against sliding and loss.

The joint 22 can be held in the operating position and in the transport position of the stalk divider 20. For this purpose a first locking element 54 is provided that is formed on its upper side as a hook-shaped hand-grip element. A second pin-shaped locking element 56 is also provided. The first and the second locking elements 54 and 56 are arranged in the interior of the rear region of the first tube 36, as seen in the forward operating direction V. The locking elements 54 and 56 are connected to one another mechanically by a sleeve 66 that extends axially in the end region of the first tube 36. The second locking element 56 is located closer to the pivot pin 52 than the first locking element 54. The first locking element 54, the sleeve 66 and the second locking element 56 are slidably supported in bearings in the end region of the first tube 36 so that they can slide in the longitudinal direction. The locking elements 54 and 56 extend radially in the end region of the first tube 36 in approximately vertical direction. The upper ends of the locking elements 54 and 56 extend through a slot 60 on the upper side of the first tube 36 (see FIGS. 3 and 4). The underside of the first locking element 54 also extends through a corresponding slot on the underside of the first tube 36.

The first and the second locking elements 54 and 56 are biased by the force of a helical spring 62 that is supported at one end on the first locking element 54 and at the other end on a pressure pad 64, that is fastened to the first tube 36. The spring 62 forces the first locking element 54 to the right as seen in FIG. 2, which also forces the second locking element 56 to the right by means of the sleeve 66. Thereby the underside of the first locking element 54 engages the first cut 68 that is provided in the first leg 44 of the retainer 42, see FIGS. 3 and 4, when the deflector 30 is located in the operating position. The width of the first cut 68 is only slightly larger than that of the first locking element 54. Thereby the spring 62 has the result of holding the stalk divider 20.

The upper end of the first locking element 54 that projects above the upper side of the first tube 36 forms a hand-grip surface that makes it possible to withdraw the locking element 54 manually against the force of the spring 62 out of the first cut 68 in the first leg 44 of the retainer 42, in order to pivot the stalk divider 20 into a transport position. After the first locking element 54 has been withdrawn from the first cut 68 and the deflector 30 has been pivoted through a certain angle (a few degrees) inward—to the right in FIG. 3—, the operator can release the locking element 54. During the pivoting of the deflector 30, the first locking element 54 slides along the edge of the first leg 44 of the retainer 42, until the upper end of the second locking element 56 comes to rest against the edge of the second leg 46 of the retainer 42. The edges of the legs 44 and 46 form a sort of curved guide path for the locking elements 54 and 56. If the stalk divider 20 has been pivoted into its transport position, the upper end of the second locking element 56 reaches a U-shaped second cut 70 in the second leg 46 of the retainer 42 under the effect of the spring 62. Since the width of the second cut is only slightly larger than the diameter of the second locking element, the second element 56 is held there by the force of the spring 62. It would also be conceivable that the first locking element 54 be held over the entire pivoting path of the stalk divider 20 and is released only upon reaching the operating position or the transport position.

Pivoting from the transport position into the operating position is performed in the opposite sequence, where initially the second locking element 56 is brought out of engagement with the second cut 70 in that the operator draws the upper end of the first locking element 54 away from the pivot axis 24.

In the operating position the stalk divider 20 is arrested by the first locking element 54, which is spaced relatively far from the pivot axis 24. Due to the large spacing the play at the point of the stalk divider is quite small. In the transport position the stalk divider 20 is arrested by the second locking element 56, which is located closer to the pivot axis 24. The result is a larger play of the stalk divider 20, which, however, is not noticeably detrimental in the transport position. On the other hand the use of the second locking element 56 makes it possible to configure the retaining arrangement 42 relatively narrow, so that only few stalks can become entangled at the joint 22. By the arrangement of the spring 62 and significant parts of the locking elements 54 and 56 in the interior of the first tube 36, a relatively compact configuration of the joint 22 is also attained.

It would also be conceivable to connect the first tube 36 rigidly with the retaining arrangement 42 and the second tube 38 with the journal 50.

Having described the illustrated embodiment, it will become apparent that various modifications can be made without departing from the scope of the invention as defined in the accompanying claims.

What is claimed is:

1. A stalk divider for a harvesting assembly that has a forward operating direction, the stalk divider comprising a deflector that can be pivoted by a joint about a pivot axis between an operating position and a transport position, the deflector can be held in the operating position and in the transport position, the joint is provided with a first locking element, with which the joint can be held in the operating position, the joint is also provided with a second locking element with which the joint can be held in the transport position, the first locking element is spaced at a greater distance from the pivot axis than the second locking element, the first locking element and the second locking elements are arranged along a straight line which extends through the pivot axis, when the deflector is in its operating position the first and second locking element are located forward of the pivot axis in relation to the forward operating direction, wherein the first locking element and the second locking element are forced by a spring into a detent position.

2. A stalk divider as defined by claim 1 wherein the spring is located within a tube that retains the deflector.

3. A stalk divider as defined by claim 2 wherein the first locking element and the second locking element are arranged to slide within the tube in a longitudinal direction.

4. A stalk divider as defined by claim 3 wherein the first locking element and the second locking element are arranged in the interior of a tube.

5. A stalk divider as defined by claim 4 wherein the first locking element engages a first cut out when the deflector is in its operating position and the second locking element engages a second cut out when the deflector is in its transporting position.

6. A stalk divider as defined by claim 5 wherein the first cut out is located beneath the pivot bearing arrangement, and the second cut out is located above the pivot bearing arrangement.

7. A stalk divider as defined by claim 6 wherein the tube is pivotally mounted to a U-shaped retainer having an upper leg on which the second cut out is located and a lower leg on which the first cut out is located.

8. A stalk divider as defined by claim 7 wherein the stalk divider is mounted to a harvesting platform.

9. A stalk divider as defined by claim 1 wherein the first locking element and the second locking element are forced by a spring into a detent position.

10. A stalk divider as defined by claim 9 wherein the spring is located within a tube that retains the deflector.

11. A stalk divider as defined by claim 10 wherein the first locking element and the second locking element are arranged to slide within the tube in a longitudinal direction.

12. A stalk divider as defined by claim 11 wherein the first locking element and the second locking element are arranged in the interior of a tube.

13. A stalk divider as defined by claim 12 wherein the first locking element engages a first cut out when the deflector is in its operating position and the second locking element engages a second cut out when the deflector is in its transporting position.

14. A stalk divider as defined by claim 13 wherein the first cut out is located beneath the pivot bearing arrangement, and the second cut out is located above the pivot bearing arrangement.

15. A stalk divider as defined by claim 14 wherein the tube is pivotally mounted to a U-shaped retainer having an upper leg on which the second cut out is located and a lower leg on which the first cut out is located.

* * * * *